United States Patent

[11] 3,629,783

| [72] | Inventor | Robert W. Holzwarth |
| | | Allen Park, Mich. |
| [21] | Appl. No. | 857,990 |
| [22] | Filed | Sept. 15, 1969 |
| [45] | Patented | Dec. 21, 1971 |
| [73] | Assignee | Ford Motor Company |
| | | Dearborn, Mich. |

[54] FLAT WIRING HARNESS ROUTING ARRANGEMENT
10 Claims, 9 Drawing Figs.

[52] U.S. Cl. .................................................. 339/4, 339/147 C
[51] Int. Cl. .................................................... H01r 35/00
[50] Field of Search .......................................... 339/4, 5, 8, 17 F, 176 MF, 2, 147; 312/223

[56] References Cited
UNITED STATES PATENTS

| 3,322,886 | 5/1967 | Warshawsky ................. | 339/2 R X |
| 3,300,572 | 1/1967 | Dahlgren et al. ............. | 339/17 F |
| 3,053,564 | 9/1962 | Evans et al. .................. | 339/4 X |

FOREIGN PATENTS

| 423,319 | 1/1935 | Great Britain ................ | 339/4 |

Primary Examiner—Richard E. Moore
Attorneys—John R. Faulkner and E. Dennis O'Connor ABSTRACT: An arrangement for routing a flat, electrical wiring harness from a relatively stationary structural member such as a motor vehicle body to a movable structural member such as a vehicle door that is hingedly connected to the stationary member. The wiring harness is formed having two relatively straight portions that axially are offset and are connected by a third portion disposed perpendicularly to both the straight line portions. The harness is positioned so that it extends from one of the structural members into a hollow, protective housing secured to at least one of the structural members. Within the housing, the configuration of the harness is a coil that includes the third harness portion. The harness extends from the housing to the other of the structural members so that it is capable of conducting electrical energy between these members.

INVENTOR.
Robert W. Holzwarth
BY John L. Faulkner
E. Dennis Connor
ATTORNEYS.

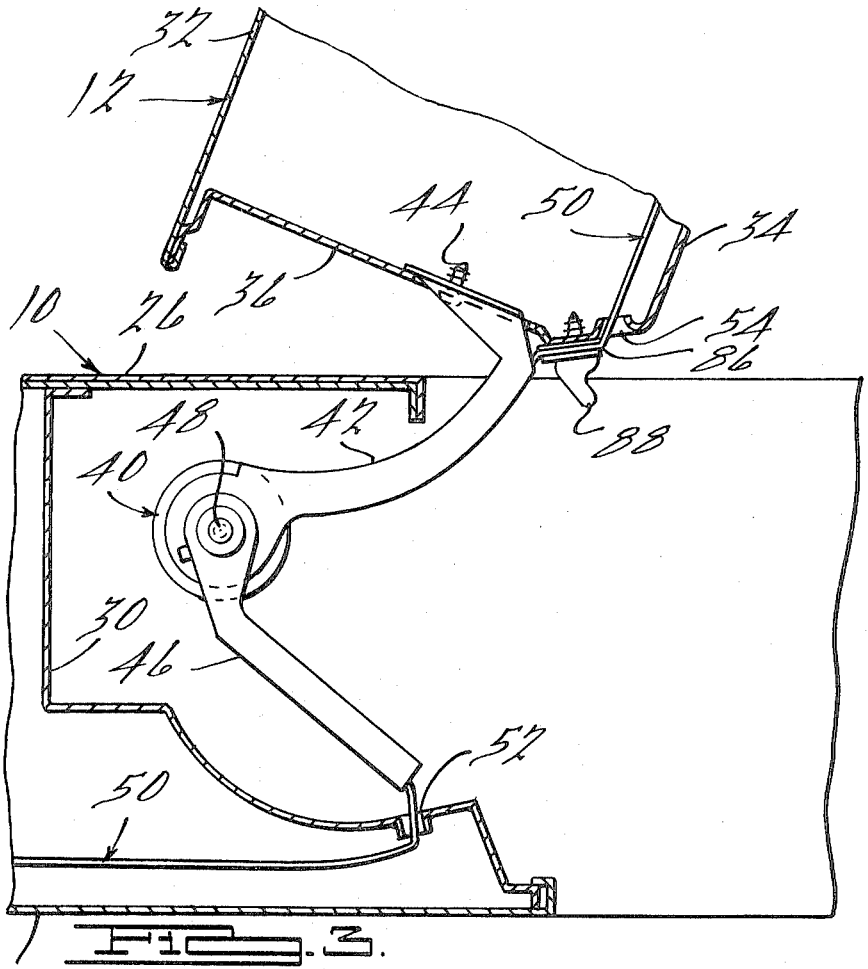
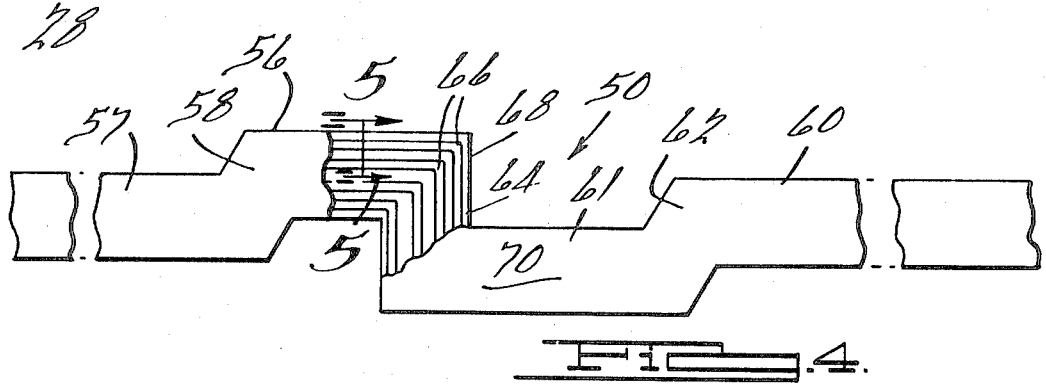
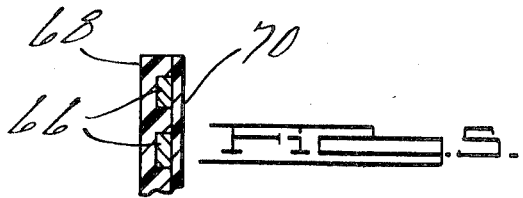

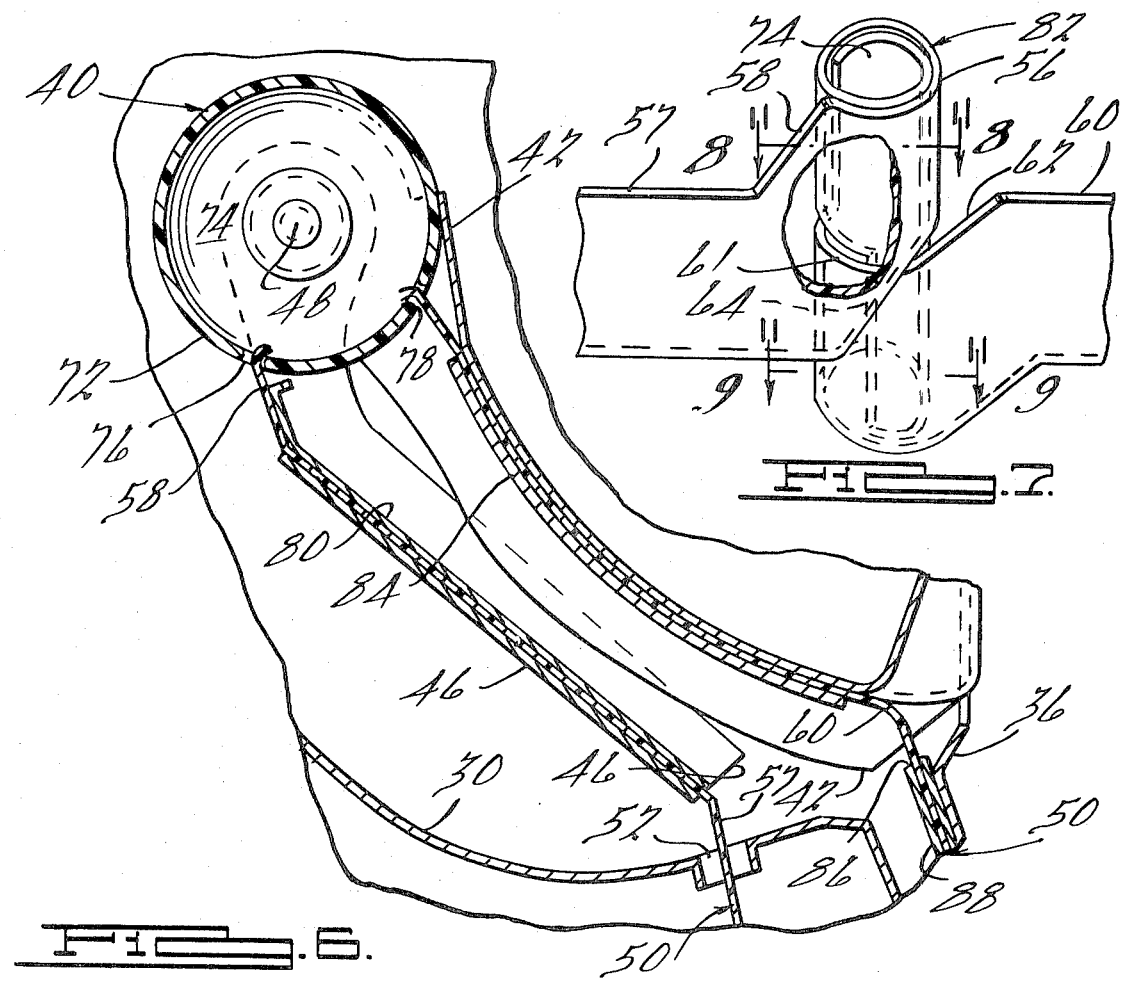

FLAT WIRING HARNESS ROUTING ARRANGEMENT

BACKGROUND OF THE INVENTION

In recent years, some motor vehicle electrical systems have included circuit elements comprising flexible flat wiring harnesses. Such harnesses are composed of so-called "flat wire" conductive elements, that may be etched from a sheet of conductive material or otherwise suitably formed, surrounded by insulating material that commonly is a plastic material. Many advantages are attributable to utilizations in the motor vehicle arts of harnesses of this type.

It has become desirable, especially in vehicles having many power operated accessories, to locate various electric switches controlling these accessories in the interior trim panels of the vehicle doors. Examples of such switches are those controlling the operation of power actuated window regulators. It is necessary, of course, for these switches to be connected with the vehicle power source and the power consuming circuit elements. If these connections are to be accomplished via a flat wiring harness, it is necessary to route this harness from the vehicle body to the door at the region of the door hinge face.

If the flat wiring harness simply extends from the vehicle body pillar from which the door is hung to the door hinge face, the reliability of wiring harness over the life of the vehicle deleteriously may be affected. This is because the wiring harness, while not being rigid, is of limited flexibility because it must be made of a rather heavy, flat conductive material, such as copper to accommodate the current loads involved, and rather heavy layers of insulation so that the wiring harness will not tear when twisted or subjected to various stresses. Naturally, these relatively stiff materials tend to negate great flexibility of the harness and stiffen this element. If such a harness so constructed then is subjected to a great number of bending moments, as are applied to a harness merely extending from body pillar to door as the door repeatedly is swung about its hinge axis, a back and forth bending of the harness occurs. This bending is between curved configurations having relatively small radii and renders it possible for the harness conductive elements and insulation to crack, tear and fail.

It is an object of this invention to provide an arrangement for routing a conventional flat wiring harness of the vehicular type from a relatively stationary structural member such as a vehicle body pillar to a relatively movable member such as a vehicle door. This arrangement provides that repeated movement of the relatively movable structural member, causing a bending of the harness, does not tend to promote cracking and/or tearing of the harness. This arrangement further provides that the bending of the harness that occurs causes manipulations of the harness only into curved configurations having relatively large radii. In this manner, the concentration of stresses along relatively small areas of the harness is prevented. Also, this arrangement provides that portions of the harness extending between the structural members, and otherwise vulnerable to abrading forces and other forces threatening the integrity of the harness, are armored.

SUMMARY OF THE INVENTION

The flat wiring harness routing arrangement of this invention is adapted for the locating of a flat wiring harness utilized in combination with a first structural member and a second structural member secured to the first member for movement relative thereto. Protective housing means operatively are secured to at least one of the structural members and define a generally closed chamber. These housing means have access means formed therethrough to the chamber. The harness comprises an elongate, electrically conductive means for conveying electrical energy from one of the structural members to the other. These conductive means include first and second portions being formed in substantially straight line configurations and a third portion having a substantially straight line configuration and extending in a direction perpendicular to the first and second portions. The third portion interconnects the first and second portions. The conductive means extend from one of the structural members through the access means and into the housing chamber. Within the chamber, the conductive means are formed into at least one coil that includes the third portion of the conductive means. The conductive means then extend through the access means from the housing chamber to the other of the structural members.

DESCRIPTION OF THE DRAWING

FIG. 3 is a view similar to FIG. 2 but showing the vehicle door in an open position;

FIG. 4 is a view with parts broken away of the flat wiring harness as it is manufactured for inclusion in the arrangement of this invention;

FIG. 5 is a partial sectional view taken along the line 5—5 of FIG. 4;

FIG. 6 is a sectional view taken along the line 6—6 of FIG. 1;

FIG. 7 is an isometric view, with parts broken away, illustrating the configuration of the flat wiring harness of FIG. 4 in the harness routing arrangement of this invention;

FIG. 8 is a sectional view taken along the line 8—8 of FIG. 7; and

FIG. 9 is a sectional view taken along the line 9—9 of FIG. 7.

DETAILED DESCRIPTION OF THE INVENTION

Figure 1:
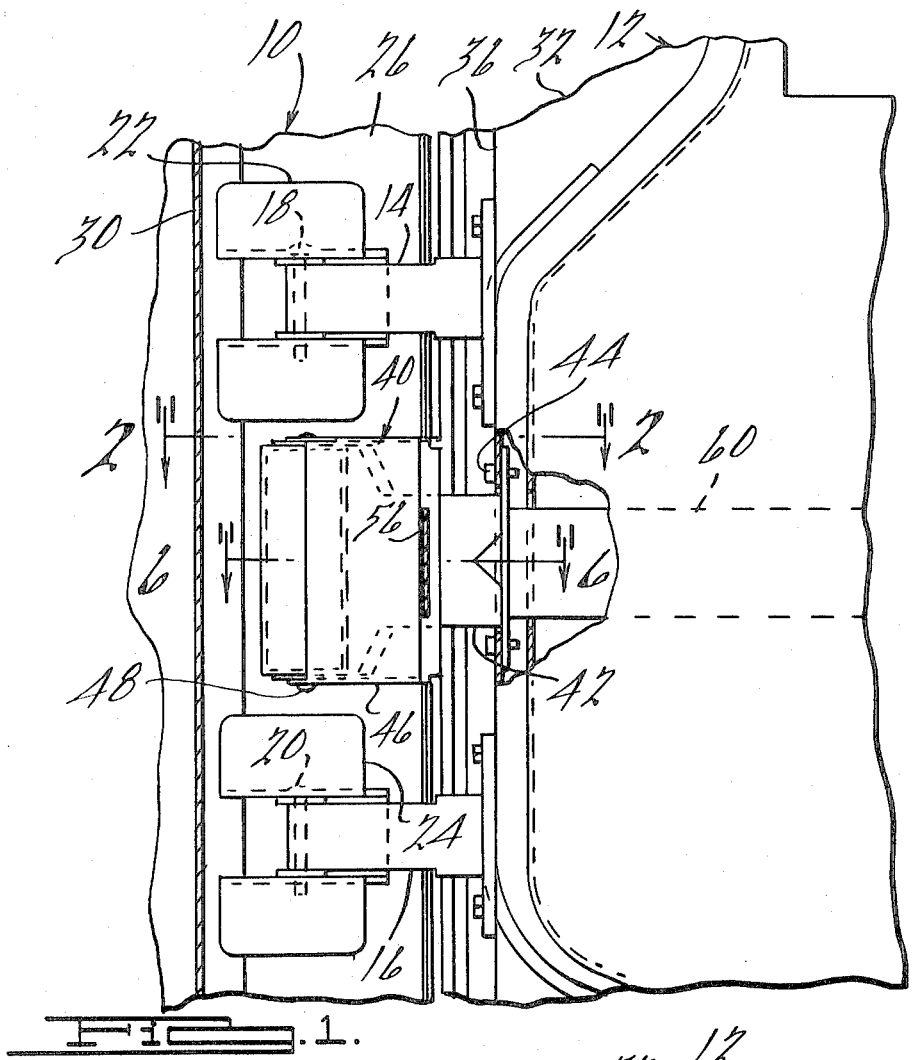
FIG. 1 is a side elevation view, partially in section and with parts broken away for purposes of clarity, illustrating a portion of the door hinge area of a motor vehicle utilizing the flat wiring harness routing arrangement of this invention.
Figure 2:
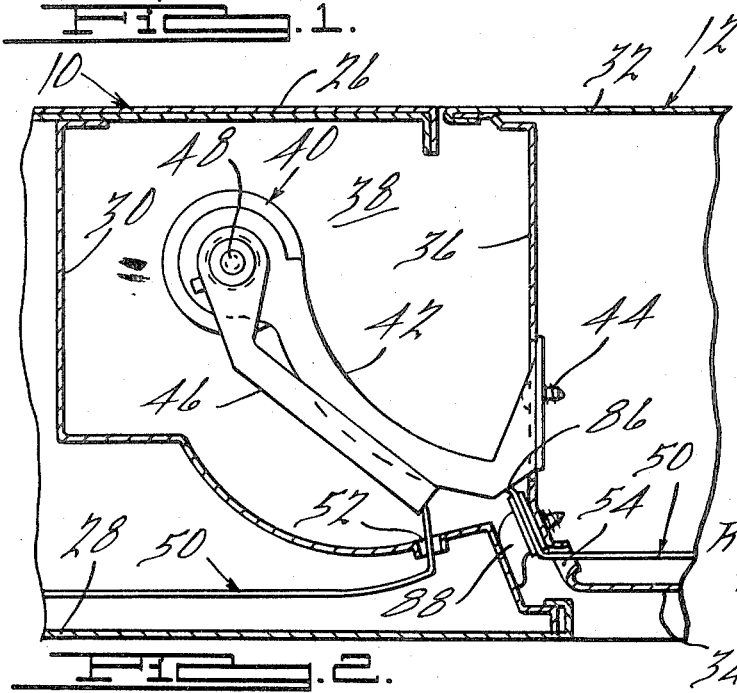
FIG. 2 is a sectional view taken along the line 2—2 of FIG. 1.

Referring now in detail to the drawings, and in particular to FIGS. 1 to 3 thereof, the numeral 10 denotes generally a motor vehicle body pillar of the type from which vehicle door closure members are hung. The numeral 12 denotes generally a motor vehicle door hingedly connected to the pillar 10. This connection is accomplished by means of a pair of hinge arms 14 and 16 connected by pivot pins 18 and 20 to hinge mounts 22 and 24 respectively. The hinge mounts 22 and 24 are mounted on the pillar 10.

Body pillar includes includes an exterior panel 26 spaced apart from an interior panel The door hinge face 36 The exterior and interior panels are interconnected by a hinge face panel 30 to which the hinge mounts 22 and 24 are connected.

Door 12 door hinge face 36 an exterior panel 32 that is spaced from an interior panel 34. The interconnects panels 32 and 34. Hinge arms 14 and 16 are secured by suitable fasteners to the door hinge face 36.

From FIG. 2, wherein the elements described above are oriented as when door 12 is in the closed position, it may be seen that the hinge face 30 of pillar 10 and the door hinge face 36 are spaced apart and cooperate with pillar outer panel 26 to define a cavity 38. Within this cavity is located a protective housing 40 having a generally cylindrical shape that will be described in greater detail below. An arm 42 is integrally connected to housing 40 and extends therefrom to door hinge face 36 to which it is attached by fasteners 44. A second arm 46 is pivotally connected to the housing 40 at the top and bottom of the housing along the housing vertical axis 48.

The housing 40 and related structure are utilized in the flat wiring harness routing arrangement of this invention to facilitate the routing of a flat wiring harness 50, best seen in FIG. 4, such that this harness may be used to conduct electrical energy between body pillar 10 to door 12. As best may be seen in FIGS. 2 and 3, flat wiring harness 50 extends from pillar 10 through an aperture 52 formed through the pillar hinge face 30. This flat wiring harness 50 is routed through the protective housing 40, as will be described in greater detail below, and through an aperture 54 located between door inner panel 34 and door hinge face 36. The precise construction of flat wiring harness 50, the housing 40 and the attendant structure enabling the wiring harness to be so routed in a manner that minimizes damage or failure of the wiring harness best may be seen by reference to FIGS. 4 to 9 of the drawings.

In FIGS. 4 and 5, it may be seen that this wiring harness is constructed with a first generally straight line portion including harness segments 56, 57 and 58. Segment 56 is constructed along a straight line as is harness segment 57. A slight jog 58, the significance of which will be described below, interconnects segments 56 and 57. A second, generally straight line harness portion includes harness segments 60 and 61 that extend along straight lines and are connected by the jog 62. These first and second generally straight harness sections are interconnected by a third harness portion 64 that extends in a straight line, but is perpendicular to the first and second portions.

The harness includes a plurality of electrically conductive flat wires 66 that may be formed, as by acid etching or other suitable means, from a sheet of electrically conductive material such as copper. As may be seen from FIG. 5, flat wires 66 are surrounded by two plys 68 and 70 of electrical insulation material. Of course, one or both of the plys of insulation material may be removed or omitted at any point along the length of harness 50 at a location where an electrical connection with one of the flat wires 66 is desired.

Referring now in particular to FIG. 6 of the drawings, it may be seen that the protective housing 40 includes a hollow cylinder 72 of electrical insulating material that is rigid and acts as an armor element for a portion of the harness 50 that passes therethrough. Cylinder 72 defines a central chamber 74 therein. Access to the chamber 74 is provided by a pair of slots 76 and 78 formed through the side wall of cylinder 72.

It may be seen from FIG. 6 that segment 57 of harness 50 extends through opening 52 in pillar hinge face 30 and extends along the length of the arm 46 that is pivotally connected to the cylinder 72 at the top and bottom of the cylinder (see FIG. 1). The side of segment 57 remote from arm 46 is overlaid by a protective cover 80 that is secured to arm 46. The purpose of cover 80 is to prevent abrasive contact between foreign elements and harness 50 when door 12 is in the open position illustrated in FIG. 3. At jog segment 58, the wiring harness 50 extends through slot 76 and into the central chamber 74 of cylinder 72.

From FIG. 7, it may be seen that the harness 50 is manipulated into a coil configuration within chamber 74. This coil configuration includes straight line harness segments 56 and 61, as well as interconnecting, perpendicularly disposed harness segment 68. The fact that harness segments 56 and 61 are vertically offset enables these portions to clear one another as they extend from the coil formed in the harness 50.

Jog segment 62 of the harness extends through the slot 78 formed in cylinder 72. Harness straight line segment 60 extends along the length of arm 42 that is integrally connected, as by a suitable joining technique, to cylinder 72. The surface of harness segment 60 remote from arm 42 is covered by a protective element 84 that is suitably secured to arm 42 and prevents damage to the wiring harness 60 when the door 12 is in the open position. Segment 60 of wiring harness 50 extends through an opening 86 formed in a vertically extending weather strip 80 secured to the door hinge face 36, and extends through opening 54 into the door 12 where suitable electric switches such as power window switches may be electrically connected to the wiring harness.

It should be noted that the wiring harness 50 illustrated, although having a substantial vertical offset due to the perpendicularly extending portion 64, enters and leaves the cylinder 72 at the same height. This is due to the formation of the jog segments 58 and 62 that enable harness portions 57 and 60 to lie along the same horizontal axis as may be seen in FIG. 4. It readily may be appreciated, however, that the formation of jog portions 58 and 62 is not necessary to the practice of this invention. It would be possible to allow harness portions 56 and 70 to extend in vertically offset paths away from the perpendicular portion 64, and still route harness 50 as described above from body pillar 10 to door 12.

The routing of the flat wiring harness 50 as described above provides that when door 12 is hingedly moved relative to body pillar 10, the resultant bending of the harness 50 does not cause a concentration of stresses at a small area along the length of the harness. This is because the formation of a coil in the harness within chamber 74 of cylinder 72 provides that the bending of the harness during door movement occurs over a relatively long length of the harness, that is, the portion of the harness formed into a coil. It should be understood that more than one coil revolution may be formed within the chamber 74.

It should be noted that in addition to providing resistance to failure due to repeated bendings, the arrangement of this invention provides armor for the harness 50 along the length of the harness vulnerable to damage when the vehicle door is open. Arms 42 and 44, cooperating with cover elements 84 and 80 respectively as well as cylinder 72, constitute the armor that protects the wiring harness.

I claim:

1. In combination with a first structural member and a second structural member secured to said first member for movement relative thereto, protective housing means operatively secured to at least one of said members and defining a generally closed chamber, said housing means having access means formed therethrough to said chamber, and elongate electrically conductive means for conveying electrical energy from one of said members to the other, said conductive means including first and second portions being formed in substantially straight line configurations and a third portion having a substantially straight line configuration and extending in a direction normal to said first and second portions, said third portion being located between said first and second portions, said conductive means extending from one of said members through said access means into said chamber, being formed in at least one coil within said chamber and extending through said access means from said chamber to the other of said members, said coil including said third portion.

2. The combination of claim 1, wherein said conductive means includes a substantially flat conductive element.

3. The combination of claim 1, wherein said conductive means comprises a substantially flat wiring harness including flat wire conductors encased in electrically insulating material.

4. The combination of claim 3, wherein said housing means are formed from electrical insulating material.

5. The combination of claim 4, wherein said housing means comprise a generally hollow cylinder, said access means comprising a pair of slots formed through the sidewall of said cylinder.

6. The combination of claim 5, including a rigid first arm secured to cylinder for movement therewith and extending from said cylinder to a point on one of said members where said first arm is secured to said one member, and a second rigid arm pivotally secured to said cylinder for movement relative thereto, extending from said cylinder to the other of said members and secured to the other of said members.

7. The combination of claim 6, wherein said one member comprises a motor vehicle door and said other member comprises a motor vehicle body door pillar, said door being hingedly connected to said pillar.

8. An assembly for conducting electrical energy from a first structural member comprising a motor vehicle body element to a second structural member comprising a motor vehicle body element hingedly attached to said first member for movement relative thereto, said assembly including a flat wiring harness having electrically conductive elements, said harness having a first portion extending from said first structural member to a rigid housing defining a chamber, said housing being operatively secured to at least one of said members, said first harness portion extending through a first opening in said housing and into said chamber, said harness having a second portion located within said housing and being formed into at least one coil, said harness having a third portion extending from said chamber through a second opening in said housing to said second structural member.

9. The assembly of claim 8, wherein said wiring harness is elongated and said first and third harness portions are interconnected by said third portion that extends angularly with respect to both said first and second portions.

10. The assembly of claim 8, wherein said rigid housing is formed in the shape of a hollow cylinder having a first mounting arm rigidly secured thereto for movement therewith and a second mounting arm pivotally secured to said cylinder for movement relative thereto, said first mounting arm being secured to said first structural member and said second mounting arm being secured to said second structural member.

* * * * *